United States Patent [19]

Yago

[11] 4,208,004
[45] Jun. 17, 1980

[54] METHOD FOR MAKING AUGERS

[75] Inventor: Jeffrey R. Yago, Barboursville, W. Va.

[73] Assignee: Jess Estep, Ridgeview, W. Va.

[21] Appl. No.: 8,089

[22] Filed: Jan. 31, 1979

Related U.S. Application Data

[63] Continuation of Ser. No. 740,008, Nov. 8, 1976, Pat. No. 4,140,264.

[51] Int. Cl.$^2$ ............................................. B23K 31/02
[52] U.S. Cl. .................................. 228/173 D; 29/456
[58] Field of Search ............. 228/173 D, 182; 29/727, 29/157.3 AH, 456

[56] References Cited

U.S. PATENT DOCUMENTS

| | | | |
|---|---|---|---|
| 1,775,555 | 9/1930 | Dorndorf | 29/456 |
| 2,442,446 | 6/1948 | Wallace | 29/456 X |
| 3,106,954 | 10/1963 | Worley | 72/144 |
| 3,377,459 | 4/1968 | Brown et al. | 29/157.3 AH |
| 3,457,749 | 7/1969 | Smola | 71/142 |
| 3,568,288 | 3/1971 | Nihlen | 113/118 A X |
| 4,043,499 | 8/1977 | Dix et al. | 29/456 X |

FOREIGN PATENT DOCUMENTS 658097  3/1938  Fed. Rep. of Germany .......... 29/157.3

Primary Examiner—Francis S. Husar
Assistant Examiner—K. J. Ramsey
Attorney, Agent, or Firm—Gipple & Hale

[57] ABSTRACT

An auger manufacturing apparatus comprising an adjustable former mechanism including a plurality of linearly adjustable die roller members and an associated movable chuck assembly. A conveyor carries a metal ribbon to the adjustable former mechanism which bends the ribbon around a pipe. The pipe is supported in part by the chuck assembly which includes a rotatable ring with a ribbon holding mechanism and an adjustable pipe seat. The cylindrical pipe is mounted in the seat and the leading edge of incoming metal ribbon is securely held by said ribbon holding mechanism. An electrically operated mechanical drive carries the chuck assembly along a trackway and rotates the rotatable ring, while the adjustable die roller members of the former mechanism provide sufficient pressure on the incoming metal ribbon to cause the ribbon to be deformed and spirally wrapped around the pipe as the pipe and leading edge of the metal ribbon carried by said chuck assembly are simultaneously rotated and driven away from the adjustable former mechanism. A seam welding apparatus is mounted to the former mechanism for welding the spirally formed ribbon to the outside wall of said pipe to form an auger.

4 Claims, 8 Drawing Figures

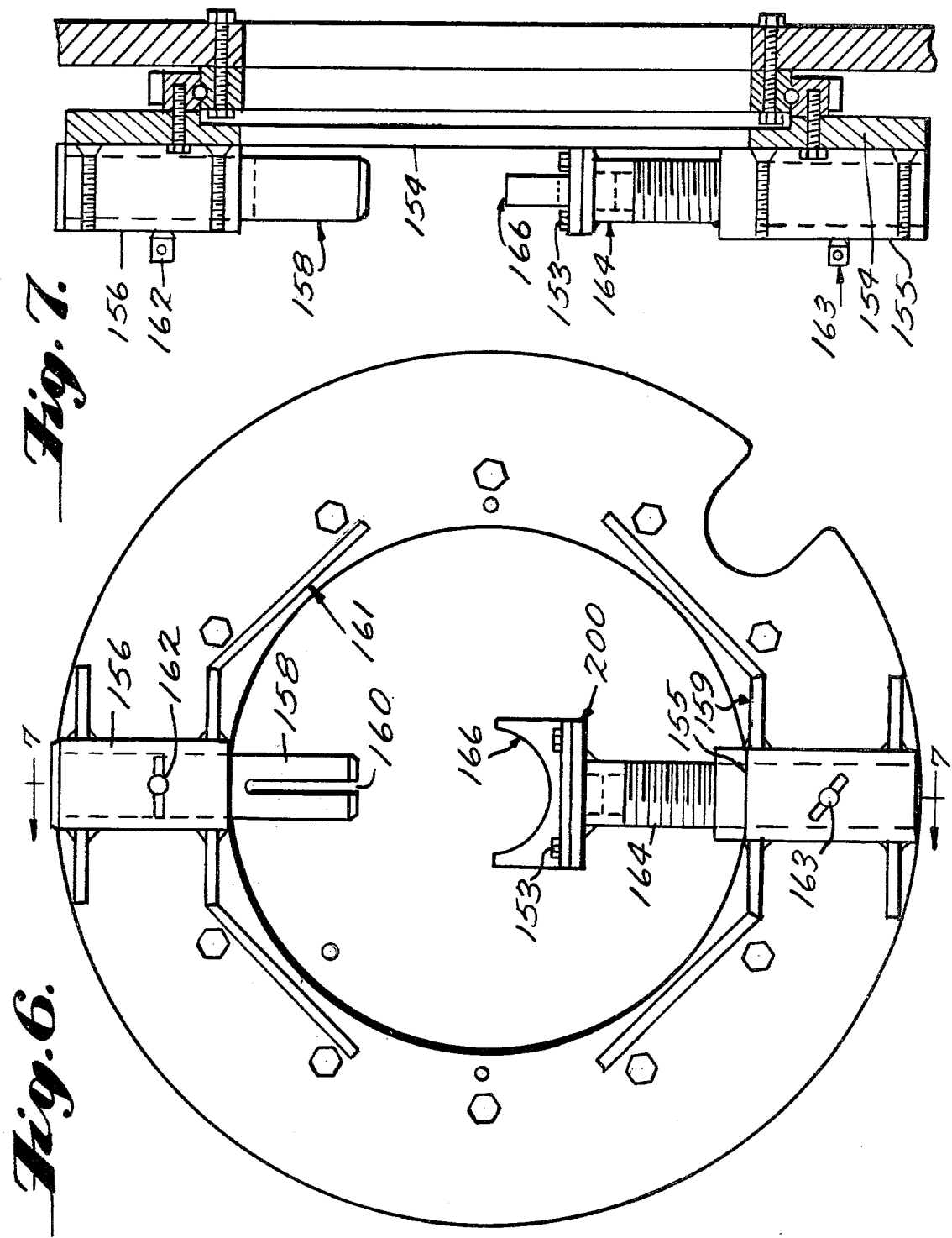

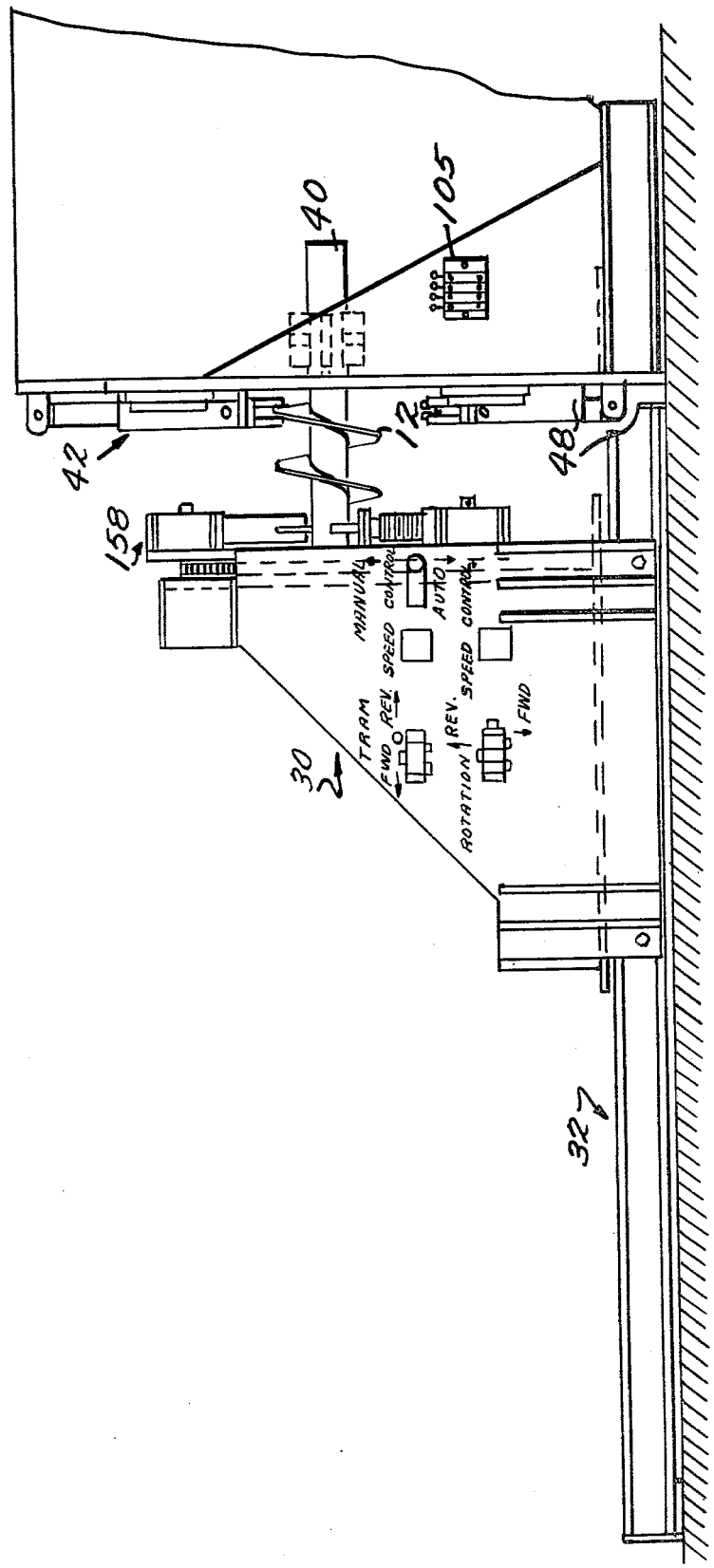

METHOD FOR MAKING AUGERS

This is a continuation of application Ser. No. 740,008 filed Nov. 8, 1976, U.S. Pat. No. 4,140,264 issued Feb. 20, 1979.

BACKGROUND OF THE INVENTION

The present device generally relates to a machine whose purpose is to wind a narrow ribbon of steel plate into a spiral shape around a central pipe section and weld the plate ribbon automatically around the pipe section to form an auger. The machine is capable of forming the ribbon spiral on both new pipe sections and old rebuilt auger sections. The machine is also adapted to add a second ribbon on top of an initial spiral ribbon and weld it in place so as to manufacture spirals of larger diameters than those presently formed with only one ribbon. In many drilling operations an auger section is needed, which cannot be manufactured by conventional means. In order to manufacture an auger of a sufficient size to be useful in larger industrial situations it is necessary to wind a narrow ribbon of steel plate around a central pipe section and weld the spiral helix in place around the pipe. In this manner a larger auger is produced which will be able to withstand the stresses of industrial use. The present machine is completely adjustable with regard to pipe diameter, pitch of threads, and size of the steel plate being used.

DESCRIPTION OF THE PRIOR ART

The wrapping of a steel ribbon around a pipe section to form an auger is old in the art.

U.S. Pat. No. 1,749,981 teaches a method of making drill stems. The invention resides primarily in the formation of helical wings or blades which are subsequently welded in an encircling position around the mandrel of the stem.

Another U.S. Pat. No. 1,909,704 teaches the wrapping of a continuous ribbon of sheet material in the form of a spiral around a tube. The wrapping of the ribbon takes place as the material is electrically heated, immediately before it is coiled on the pipe. The coil is welded to the pipe by contacting the electric heating element at the point where the material is brought in contact with the pipe.

Another U.S. Pat. No. 2,442,446 teaches a method and apparatus for making an auger. In the preferred emdodiment, a spirally wound fin is continuously welded at its base to the walls of tubing. The method disclosed in the '446 reference is carried out by first utilizing a strip of metal in the form of a continuous flat helix. The leading end of the helical fin is spot welded to the cylindrical tube and the adjacent end of the tube is clamped in a chuck on the end of a rotating shaft. A spacer guide roller is provided whose working or fin engaging face includes a straight element extending radially to the tube. The smaller end of the face of said roller is provided with an angular shoulder disposed at an angle to said face which engages the outer edge of the fin and forces the fin to the desired angular position in contact with the inclined face. The machine bed carries a block which carries a tube supporting arm engaging the tube surface opposite the aforementioned guide roller and serves to hold the tube against lateral displacement which may result from the pressure exerted by the guide roller against the fin. As the cylindrical tube is rotated, the fin acts as a screw to propel the carriage along the machine bed rails. The movement of the machine bed is corrolated with the rotation of the shaft in order to give the desired pitch to the spiral fin. A roller is rotatably supported to depend from the undersurface of an arm in line with the tube. This roller bears against the outer edge of the fin on the tube.

Yet another U.S. Pat. No. 2,604,138 discloses an apparatus for winding a continuous strip of thin metal edgewise around the circumference of a cylindrical member such as a tube. A pressing means is adapted to press the foot of the fin smoothly against the perifery of the rotating tube.

Still another U.S. Pat. No. 3,216,232 teaches a method of rolling a smooth ribbon or wire directly upon a tube so that the ribbon is wound spirally thereon and subsequently forms spaced fins when the tube is rotated and advanced. An additional feature of the apparatus provides means for advancing and rotating the tube upon which a ribbon is wound so as to coordinate the tube's motion with the tension of the ribbon placed on the tube.

SUMMARY OF THE INVENTION

This invention specifically relates to a machine whose purpose is to wind a narrow ribbon of steel plate into a spiral shape around a pipe section and automatically weld this spiral ribbon in place about the pipe. This machine comprises an adjustable former section, chuck section and ribbon conveying section. The ribbon plate entering the rolls of the adjustable former of the machine comprises sheared plate or hot rolled bar stock of a uniform thickness. A smooth-walled pipe of heavy wall construction is held by the adjustable former. The ribbon plate is jogged forward into forming die rollers by a drive rollers in the seam welding unit which is connected to the face of the former section. The seam welding unit serves to weld together separate sections of ribbon plate in order to form a continuous ribbon of steel. The ribbon plate enters the forming die rollers with the forming die rollers initially being in their "out" position. Subsequently, the forming die rollers are moved into an operational position. The die roller position is checked for correct roller alignment for the particular width of the ribbon and pipe diameter being used for the auger. A chuck assembly is then jogged along its tracks until a plate grab on the chuck is in position to attach and hold the ribbon extending out of the roller dies. The desired diameter pipe to which the spiral ribbon is to be mounted, is set into the center of the adjustable former. The center pipe is then connected to a pipe rest in the chuck. In operation, the chuck is rotated and jogged away from the adjustable former causing the ribbon to be twisted and rolled around the pipe. The spiral ribbon is then welded in place as it passes by on automatic welding head mounted upon the adjustable former. The machine is specifically designed so that the chuck assembly can move away from the adjustable former a predetermined distance per revolution of the chuck in order to produce a spiral of constant pitch. This movement is accomplished by utilization of a hydraulic pitch control valve mounted on the chuck. The hydraulic pitch control valve rides in the groove of a pitch screw. An operating finger of this valve senses the threads of the rotating pitch screw on the rod. The hydraulic valve sends hydraulic pressure to a tram driver on the chuck. The amount of oil sent to the tram driver balances the valve position along the screw thread and causes the chuck to move at a constant speed in relation to the rotating speed of the pitch screw.

If a small diameter pipe is being used, the pressure acting on the ribbon from the die rollers may be too great for the pipe and as a result the pipe walls are dented or collapsed as the ribbon is formed around it. In such a condition, the adjustable pipe rest can be swung into operational position and a dummy pipe of alloy steel with a heavy wall can be used to form the spirals side by side without pulling them into proper pitch. After a sufficient quantity of spirals for a pipe section have been formed, the dummy pipe and pipe rest can be removed and the center pipe section to which the ribbon is to be welded is slid inside the coil of ribbon formed spirals. The pipe is then connected to the pipe rest in the chuck and the spiral ribbon and pipe are pulled and rotated to produce the proper pitch between the turns of ribbon and welded in place as the ribbon passes the automatic welding head.

If the outer diameter of the helical spirals formed and welded on the pipe section are not as large as desired, the entire welded spiral assembly can be run back through the adjustable former and a second ribbon may be laid upon the outer edge of the first ribbon and automatically welded in place. When one ribbon is to be formed and welded upon a previously welded ribbon, a second hydraulic pitch control valve is positioned with its operating finger resting against the side of the initial ribbon. As the chuck rotates the pipe and welded-on ribbon, this operating finger senses the change of position of the ribbon and sends hydraulic pressure to the tram drive on the chuck. The amount of oil sent to the tram drive balances the valve position against the ribbon and causes the chuck to move the pipe at a speed in relation to the chuck's rotation so that the spirals edge is kept in the correct position above the first ribbon emerging from the die rollers. The second ribbon is then automatically welded to the first ribbon as they pass by the welding head.

Although the invention will be set forth in the claims the invention itself and the manner in which it may be made and used, may be better understood by referring to the following description taken in connection with the accompanying drawings forming a part thereof in which like reference numerals refer to like parts throughout the several views and in which:

DESCRIPTION OF THE DRAWINGS

FIG. 6 is a front elevational view of the chuck face plate, pipe rest, and plate grab;

FIG. 7 is a cross-sectional view of FIG. 6 taken along lines 6'—6'; and

FIG. 8 is a side elevational view of the adjustable former and chuck assembly with the welding head removed.

DETAILED DESCRIPTION OF THE DRAWINGS

Figure 1:
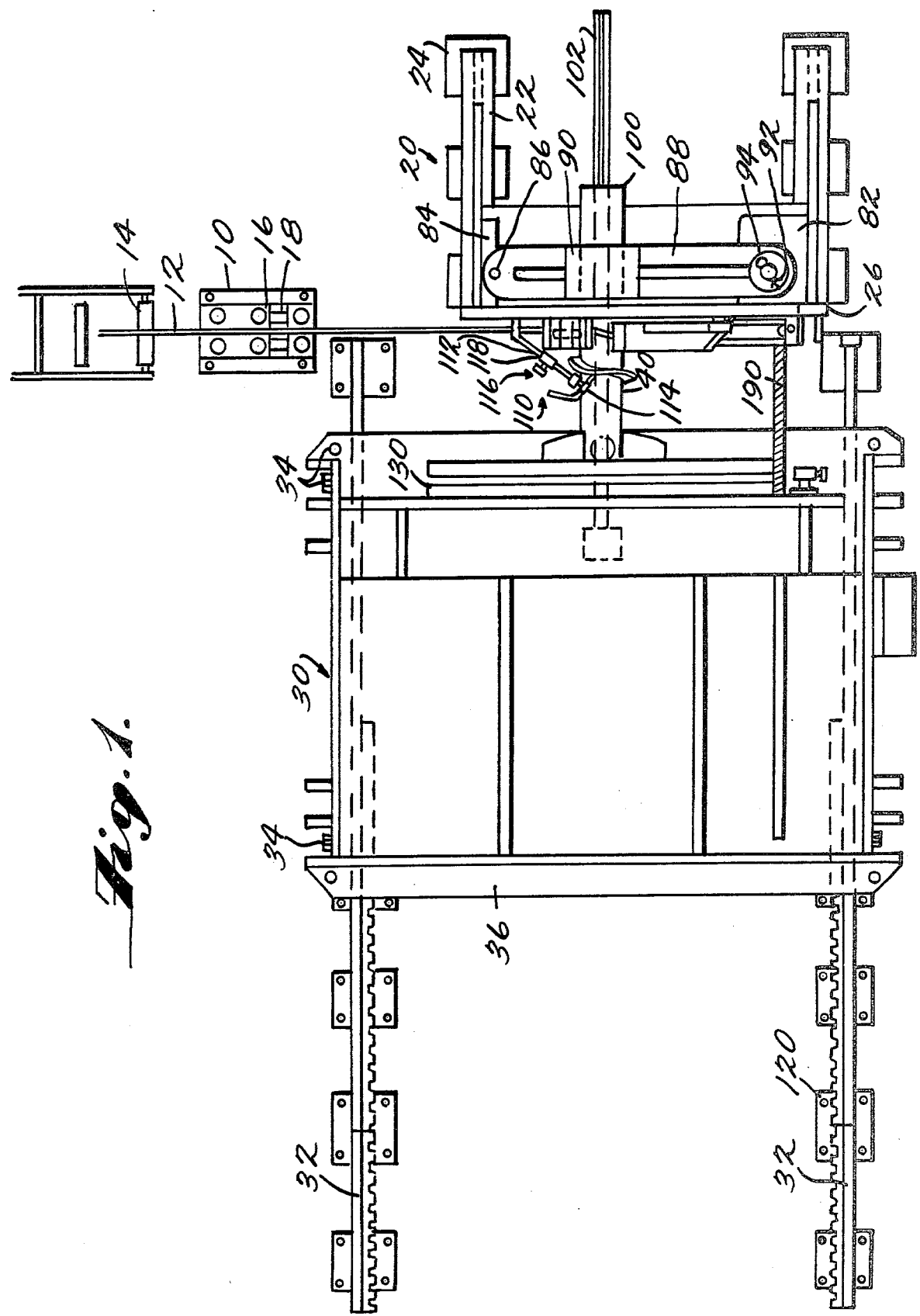
FIG. 1 is a top plan view of the seam welder, adjustable former, and chuck assembly.

As best seen in FIG. 1, a seam welder unit 10 advances a ribbon of steel 12 to an adjustable former 20 where the ribbon of steel is rotated along with a pipe 40 in a chuck assembly 30. The chuck assembly 30 is horizontally movable along chuck trackways 32 which are bolted directly to the floor. The ribbon of steel 12 is conveyed along rollers 14 through jogging rollers 16 to the adjustable former mechanism 20. As the lengths of the incoming ribbon of steel may not be sufficient to provide a helical spiral of sufficient length, a seam welder unit 10 is provided with a welder 18 to connect the ribbons of steel together. Thus a long continuous ribbon of steel can be fed to the adjustable former mechanism 20.

Figure 4:
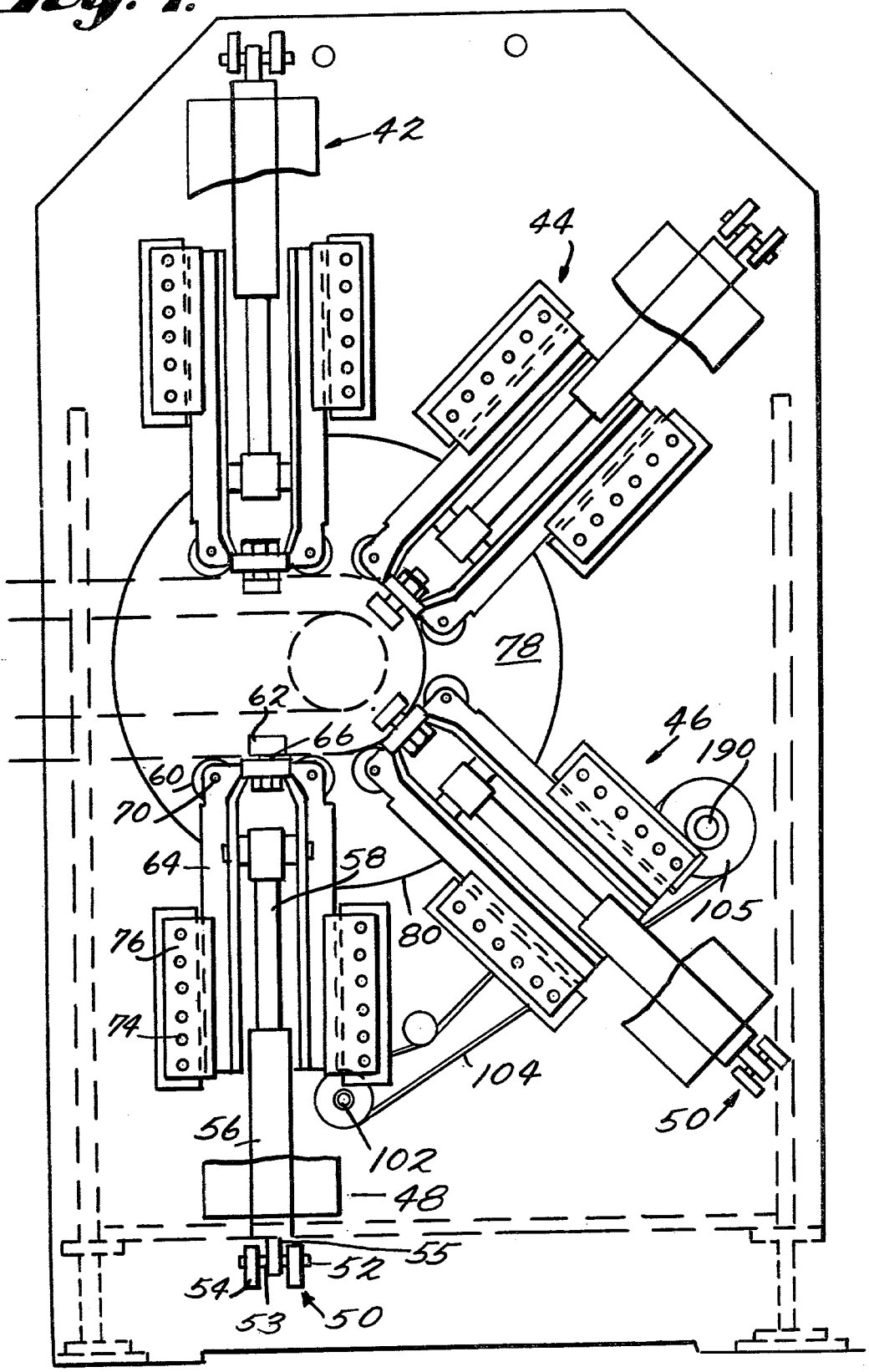
FIG. 4 is a front elevational view of the adjustable former.

As seen in FIG. 4, the adjustable former mechanism 20 rests off the floor and is mounted on "I" beam horizontal support members 22 which are seated on supports 24. The adjustable former 20 has a face plate 26 made of steel, to which are secured four adjustable die roller members 42, 44, 46, and 48. The adjustable die roller members are connected to the face plate 26 by brackets 50. The brackets 50 are secured to the face plate 26. A shaft 52 passes through apertures 54 of the brackets and an aligned aperature 53 in each yoke 55. The yoke 55 of each adjustable die roller member is positioned between the ears of the brackets 50. Each of the adjustable die roller members, 42, 44, 46, and 48 has two aligned rollers 60 and a front roller 62 which can apply pressure to the incoming ribbon of steel 12 to bend or form the ribbon circumferentially around the pipe section 40 which is held within the adjustable former. The adjustable die roller members are completely adjustable in order to accomodate various pipe diameters and assorted widths of the ribbon of steel. A hydraulic cylinder 56 in combination with its associated piston 58 provides the adjustable die roller member with linear adjustability. A slide frame 64 which is connected to the piston 58 carries the rollers 60 and 62. Front roller 62 is unrestricted in its rolling ability and is connected to slide frame 64 by means of a shaft 66, which passes through the slide frame 64 and is supported by bearings 68 (not shown). Rollers 60 located on both sides of front roller 62 are mounted on shafts 70 which are in turn allowed to freely rotate by bearings. A shaft 72 passes through both sides of slide frame 64 and a hole bored in the end of the hydraulic piston 58. The adjustable die roller members are secured in position on one end by bracket 50 and adjustably extendable on the other end so that their attached rollers 60 and front roller 62 can be moved into a plurality of positions depending upon the length of the piston 58 within the hydraulic cylinder 56. Adjusting guide plates 74 are secured on both sides of slide frame 64 and define a plurality of holes 76 which positionally correspond to holes defined by the face plate 26 of the adjustable former. In order to move the adjustable die roller members into a desired predetermined position the holes 76 of the adjusting guide plates 74 are moved to be axially aligned with the holes located in face plate 26 so that pins may be inserted into the aligned holes to hold the adjustable die roller members in the desired position.

Adjustable die roller member 42 is located vertically above the incoming ribbon of sheet steel, while adjustable die roller member 48 is located vertically beneath the ribbon of steel. Adjustable die roller members 44 and 46 are located to one side of the face plate 26, i.e., opposite the side where the ribbon of steel approaches the adjustable former. Adjustable die roller members 44 and 46 are located such that the axis of their hydraulic cylinders and pistons are at a 45° angle with respect to the incoming ribbon of steel. In operation the ribbon of steel advances into the adjustable former 20 so that the rollers 60 and front roller 62 of the adjustable roller members press against the ribbon of steel bending the ribbon around the outside diameter of the pipe held within the adjustable former. Only two of the adjustable die roller members at any one given time are in contact with the ribbon of steel. The other two adjustable die roller members merely provide additional support for the pipe held within the adjustable former. The determination of which of the two adjustable die roller members are to be in contact with the ribbon of steel is based upon whether the ribbon of steel is to be spiralled into a clockwise or counter-clockwise helical configuration about the pipe.

A circular hole 78 is located in the face plate 26 of the adjustable former. The hole 78 allows the pipe 40 which is to be made into an auger to pass through the adjustable former 20. A pipe support 80 in the shape of a semi-circular lip extends rearwardly from the lower portion of the hole 78 in the face plate 26 to support the pipe 40.

As best seen in FIG. 1, support plates 82 and 84 extend rearwardly from the rear face of the plate 26. A swinging upper support bar 88 with a sleeve 90 is pivotally mounted about a shaft 92 which is located on support plate 82. A Pin 86 extends upwardly from support plate 84 through support bar 88. In operation, when a pipe is to be placed in the adjustable former, the swinging upper support bar is pivoted about shaft 92 into the position shown in FIG. 1 allowing the pipe 40 to be inserted into position inside sleeve 90.

Figure 5:
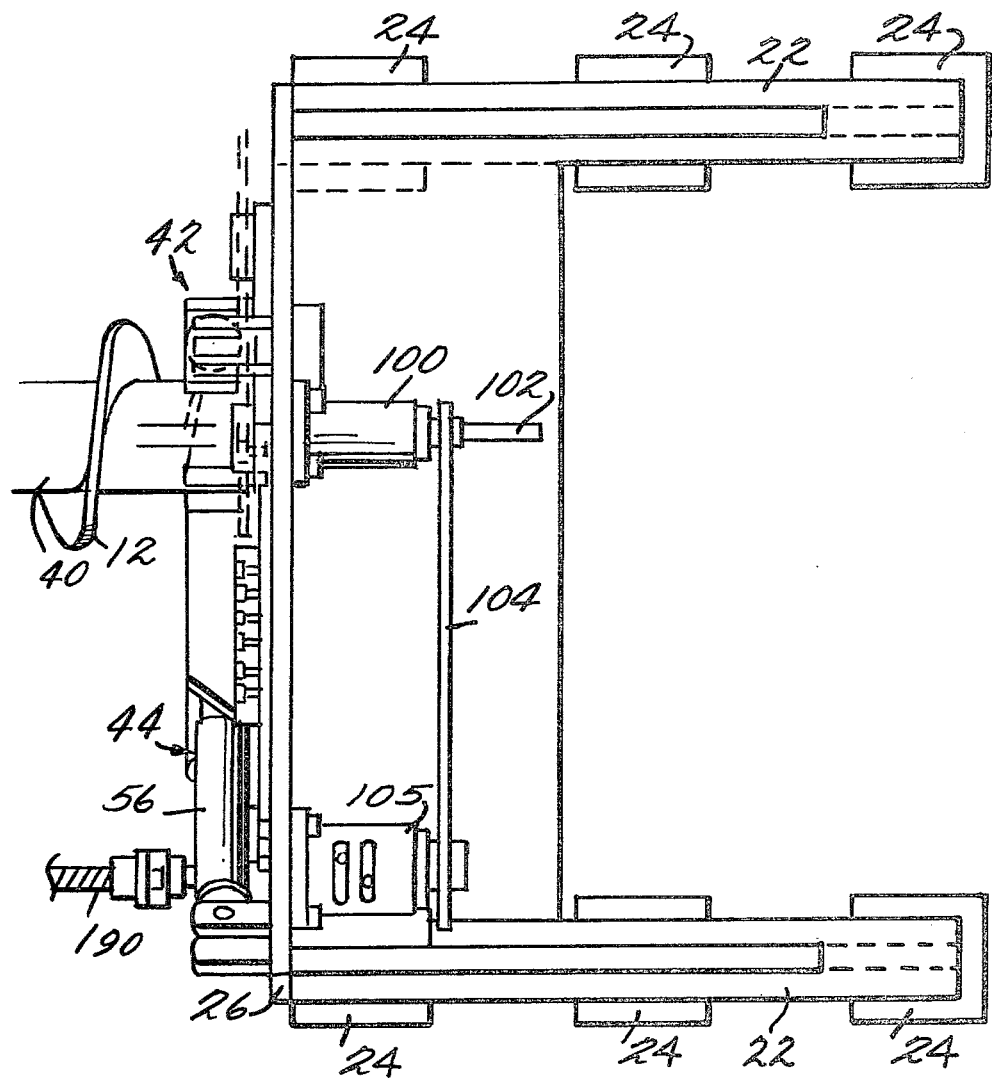
FIG. 5 is a top plan view partially in section of the adjustable former of FIG. 4.

As seen in FIGS. 1 and 5, a spline bearing assembly 100 is attached to the rear of the face plate 26 beneath the circular hole 78. A sliding spline 102 is mounted in the bearing assembly 100. Also secured to the rear of the face plate 26 is a pitch control gear box 105.

The sliding spline 102 is connected to the pitch control gear box 105 by means of timing chain 104. It will be appreciated, that the sliding spline extends through the face plate 26 of the adjustable former 20 and connects directly to the chuck assembly 30.

Mounted on the front of the face plate is the adjustable welder 110. A welder support 112 supports the welder head 114 in such a manner that the tip of the welder head travels along the seam created between the pipe and the winding of the ribbon of steel. In operation, the welder serves to secure the winding of ribbon of steel to the pipe in order to form the augers. Thumb screws 116 allow the welder support arm 118 and the welder head to adjust to a plurality of positions depending upon the diameter of the tube and the pitch desired of the windings of steel.

Figure 2:
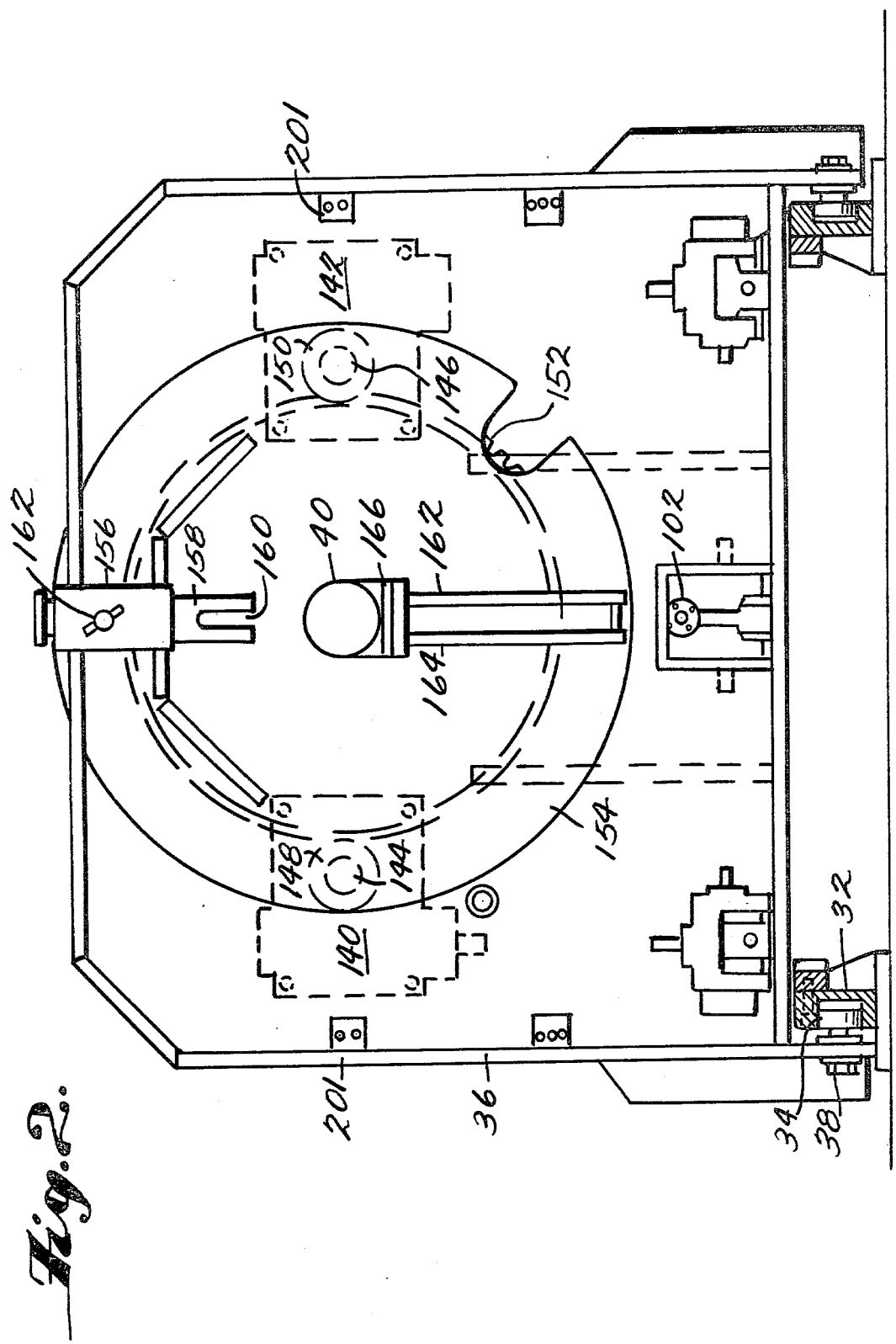
FIG. 2 is a front elevational view of the chuck assembly.
Figure 3:
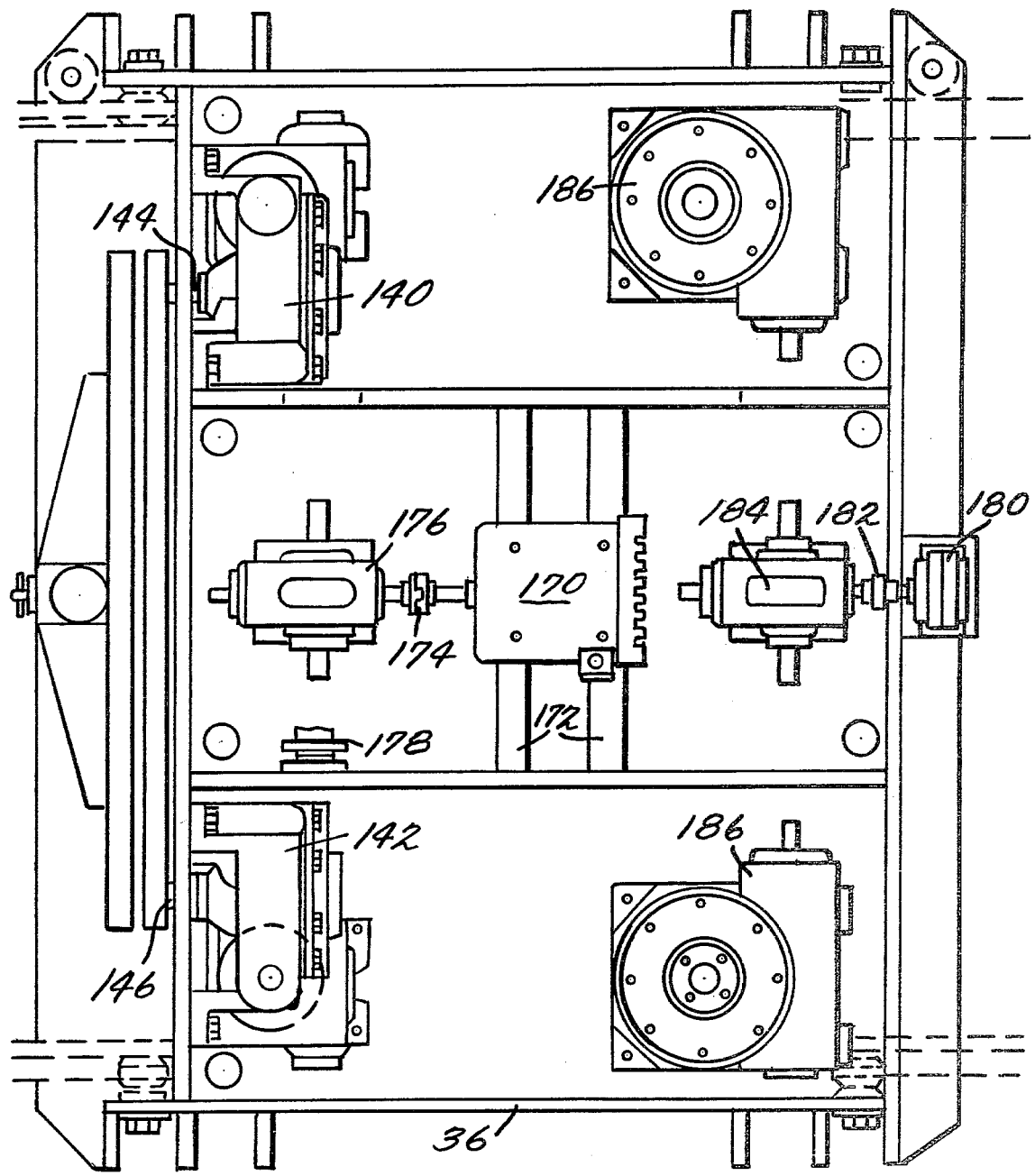
FIG. 3 is a top plan view of the chuck assembly.

The chuck assembly 30 travels along the chuck trackway 32 in order to help create the thread pitch desired on the auger. The chuck trackway 32 is secured to the floor by means of support plates 120. When the apparatus is in position for an auger to be formed, the chuck assembly is located at a point proximate to the adjustable former 20. As the auger is formed the chuck assembly travels away from the adjustable former 20 along the chuck trackway 32. As seen in FIG. 2 guide rollers 34 serve to keep the chuck on the trackway 32. The guide rollers 34 are secured to the frame 36 of the chuck assembly by means of stud rollers 38.

FIG. 2 is a front elevational view of the chuck assembly 30, with the plate 130 removed from the frame 36. Secured to the rear of the plate 130 are two identical pinion worm drive motors 140 and 142. The rotating shafts 144 and 146 respectively of these motors extend through the plate 130 and carry pinion gears 148 and 150 respectively. Located between the two pinion gears 148 and 150 is a larger circular gear 152. It can be seen that as the pinion drive motors 140 and 142 are activated they correspondingly rotate the pinion gears 148 and 150 consequently drive the larger circular gear 152 in either a clockwise or counter clockwise direction as desired.

As seen in FIGS. 2, 6 and 7, the chuck face plate 154 is attached to the forward surface of the circular gear by bolts 151. The chuck face plate 154 carries the plate grab mechanism and the pipe rest support. A mounting tube 156, secured to the chuck face plate 154 provides a sleeve through which the plate grab 158 is mounted. The plate grab is provided with a slot 160 which serves to hold the ribbon of steel 12 in a desired position against the pipe 140. A locking bolt 162 is seated in tube 156 which allows the plate grab assembly to be adjusted according to the pitch desired and the diameter of the pipe. Diametrically opposed to the plate grab 158 and also secured to the chuck face plate 154 is the pipe rest assembly 200. The pipe rest assembly consists of a pipe rest support 164 and a semi-circular pipe rest 166. In order to accomodate various pipe diameters, the pipe rest 166 may be removed by unscrewing bolts 153 and replaced by a different pipe rest of a different radius of curvature. The pipe rest support 164 is threadably mounted in a mounting tube 155. Rotation of the support in the tube raises and lowers the pipe rest 166 which serves to accomodate various pipe sizes. Another locking bolt 163 is seated in the mounting tube 155 to secure the pipe rest assembly 200 in place. A lower gusset 159 and upper gusset 161 are also secured to the chuck face plate 154.

Thus it can be seen that as the pinion worm drive motors 140 and 142 are activated, they drive pinion gears 148 and 150 which in turn cause the circular gear 152 and its attached chuck face plate to rotate. This in turn causes the plate grab and the pipe rest assemblies to also rotate accordingly. With the ribbon of steel 12 secured in slot 160 of the plate grab and the pipe 40 resting in the pipe rest assembly, rotation of the chuck face plate 154 at the same time the chuck assembly 30 is driven away from the adjustable former creates a spiral ribbon of steel around the pipe. The welder 114 in turn welds this spiral of steel to the pipe and ultimately forms the auger desired. It will be appreciated that the plate grab after a one-half rotation of the gear 152 supports the pipe section 40.

A motor 170, preferably 50 H.P. is secured to the chuck frame 36 by support bars 172. The motor 170 is conventionally connected by rotating shaft 174 to a pump 176. Pump 176 is connected via similar conventional means to two motors 178 located on both sides of said pump. The motors 178 are connected via shaft means to pinion worm drive motors 140 and 142 which as previously mentioned drive the pinion gears, and circular gear plate 152.

A hydraulic tram motor 180, also secured to the chuck frame 36, is connected via shaft 182 to a tram drive motor 184. Tram drive motor 184 is connected to two tram worm drive motors 186 located on both sides of tram drive motor 184. The tram worm drive motors rotate a worm gear (not shown) which in turn causes the chuck assembly 30 to move along the chuck trackway 32. The chuck movement is facilitated by the guide rollers 34 riding on top of the chuck trackway 32.

A pitch screw 190, conventionally attached to the pitch control gear box 105 passes through the face plate 26 of the adjustable former and the front plate 130 of the chuck. A hydraulic pitch control valve 192 mounted on the chuck rides in the groove of the pitch screw.

In order to manufacture an auger of a particular diameter with the threads of the auger having a desired pitch a length of pipe 40 of the desired diameter is placed upon a corresponding size pipe rest assembly 162. The pipe length extends through the circular hole 78 of the face plate 26 of the adjustable former 20. With the adjustable guide roller members 42, 44, 46 and 48, in their retracted position the ribbon of steel 12 is jogged forward along the conveyor rollers 14, through the jogging rollers 16, until the edge of the ribbon of steel is in contact with the outside surface of the pipe 40. If a clockwise pitch is desired the adjustable die roller members 42 and 44 are adjusted so that the top surface of the ribbon of steel contacts the rollers 60. The other two adjustable roller members 46 and 48 will not contact the ribbon of steel for a clockwise pitch but only for a counter clockwise pitch and therefore, these dormant adjustable die roller members may be utilized to further support the pipe 40. If necessary the ribbon of steel 12 may be notched on its bottom side in order to allow the ribbon to be formed easier into the edge wound spiral. Consequently the chuck assembly 30 is jogged up the chuck trackway 32 until the plate grab 158 on the chuck is in position to attach onto the ribbon of steel 12 extending out of the adjustable die roller members. As previously mentioned, the center pipe is set into the center of the adjustable former by hand or overhead crane and mounted on the pipe rest in the chuck. The chuck can then be rotated and jogged away from the adjustable former causing the ribbon to be twisted and rolled around the pipe and simultaneously welded in place as it passes the automatic welding head mounted on the adjustable former.

If a large size ribbon of steel is desired on a thin walled pipe the pressure acting on the ribbon from the adjustable die roller members may be too great for the pipe being used and as a result the pipe walls may become dented or collapsed as the ribbon is formed around it. If this condition is reached, an alternate adjustable pipe rest can be swung into position and a dummy pipe of alloy steel with a heavy wall construction can be used so as to allow spirals of ribbon steel to be formed side by side without pulling them into proper pitch. After a sufficient amount of spirals for one pipe section has been formed, the dummy pipe and pipe rest can be removed and the actual pipe section to be used can be moved into position and slid inside the coil of ribbon formed spirals. The actual pipe resting in the pipe rest of the chuck and the preformed spiral ribbon are pulled and rotated to produce the proper pitch between the turns of ribbon and welded in place as the ribbon passes the automatic welding head.

If the width of spirals formed and welded on the pipe section is not as wide as desired, the entire welded spiral assembly can be run back through the adjustable former and a second ribbon may be run through the adjustable die roller members and laid onto the outer edge of the first ribbon and automatically welded in place.

In a preferred embodiment the ribbon plate entering the rolls of the adjustable former is a sheared plate or hot rolled bar stock of a uniform width ⅜ of an inch to ⅝ of an inch thick. The pipes entering the adjustable former are to be of heavy wall construction, and may or may not have chuck ends already welded in place.

In describing the above steps it was assumed that the chuck 30 was set to move away from the adjustable former 20 the correct distance per revolution of the chuck to produce a spiral of constant predetermined pitch. If the spiral to be formed is to be welded to a new pipe section, i.e., able to be formed without a dummy pipe, and the pitch of the spiral is to be adjusted, the pitch selection is made by changing the levers on the pitch control gear box 105. This box is driven by the sliding spline shaft 102, by timing chain 104 from the chuck unit. The pitch control gear box in turn drives the pitch screw. The number of revolutions made by this screw in relation to the number of turns made by the chuck head is adjusted by the gear box. The hydraulic pitch control valve 192, riding in the groove of the pitch screw has its operating finger resting against the rotating threads of the screw. The operating finger senses the thread moving down the rod and sends hydraulic pressure through hydraulic lines 201 to the tram drive on the chuck. The amount of oil sent to the tram drive balances the valve's position along the screw thread and causes the chuck to move at a constant speed in relation to the rotating speed of the pitch screw.

If the spiral being formed is to lay on the top edge of an initial ribbon or match a rebuilt spiral of varying pitch, it would be very difficult to make gear selections of the pitch control gear box that will exactly match the initial ribbon's dimensions. To overcome this problem a second hydraulic pitch control valve can be positioned with its operating finger resting against the side of the initial ribbon. As the chuck rotates the pipe and already welded-on ribbon, the operating finger senses the change of position of the ribbon and sends hydraulic pressure to the tram drive on the chuck. The amount of oil sent to the tram drive balances the valve's position against the ribbon and causes the chuck to move the pipe at a speed in relation to the chuck's rotation that keeps the spiral's edge in the correct position under the second ribbon coming out of the die rollers. The second ribbon is then automatically welded to the first ribbon as they pass by the welding head.

In order to reduce the mass of frame required to take the stress produced during the operation of this spiral forming machine, the machine has been designed as three separate units each capable of being removed or repaired without disturbing the other units.

Since the machine consists of three separate units; a ribbon conveying section, adjustable former, and chuck assembly, it is necessary that these units be mounted on a solid foundation of reinforced concrete with proper anchor bolts in place and with a surface as level as possible. Each individual unit is then bolted into place and adjusted for proper alignment. The initial set-up takes longer than the installation time for a single unit machine, but the reduced cost and reduced problems in the transportation and fabrication of a machine with this design more than offsets the added time. Once adjusted the machine's units should never need to be realigned in reference to each other unless it has been greatly overloaded or experiences an uneven settling of the concrete foundation.

While the preferred embodiment of the invention has been disclosed, it is understood that the invention is not limited to such an embodiment since it may be otherwise embodied in the scope of the appended claims.

I claim:

1. A method of manufacturing an auger comprising the steps of:
    (a) locating and securing a pipe to a rotatable pipe support;
    (b) placing the leading edge of an incoming metal ribbon in contact with the outside wall of said pipe;
    (c) securing said leading edge of said metal ribbon to said rotatable pipe support;
    (d) rotating said pipe support and simultaneously moving said pipe support in a direction perpendicular to said incoming metal ribbon while simultaneously;
    (e) creating pressure on said incoming metal ribbon so as to form the ribbon into a spiral around said rotating pipe;
    (f) welding said spiral ribbon to the outside edge of said pipe;
    (g) placing the leading edge of a second incoming metal ribbon in contact with the initial ribbon;
    (h) rotating said pipe and said welded-on first metal ribbon along with said second ribbon;
    (i) sensing the position of the first ribbon to move the pipe at a speed in relation to the pipe support rotation to keep the first ribbon's spiral edge in correct position under the second ribbon; and
    (j) welding said second spiral ribbon to first ribbon.

2. A method of manufacturing an auger as claimed in claim 1 wherein the movement of said pipe support away from said incoming metal ribbon is controlled by a hydraulic pitch control valve which senses the rotation of an adjustable speed rotating screw and sends corresponding hydraulic fluid to a motor which rotates and moves the pipe support.

3. A method of adding a second spiral ribbon to an auger the steps of:
    (a) locating and securing an auger comprising a pipe and a spiral ribbon secured to said pipe on a support;
    (b) placing and securing the leading edge of an incoming ribbon in contact with an outside wall of the first spiral ribbon;
    (c) rotating said pipe support and simultaneously moving said pipe support in a direction perpendicular to said incoming second ribbon while;
    (d) creating pressure on said incoming second ribbon so as to form the second ribbon into a spiral around said first spiral ribbon;
    (e) rotating said pipe support and simultaneously moving said pipe support in a direction perpendicular to said second incoming ribbon; and
    (f) securing said spiral second ribbon to the outside edge of said first ribbon.

4. A method of manufacturing an auger as claimed in claim 3 wherein the movement of said pipe support away from said incoming second ribbon is controlled by a hydraulic pitch control valve which senses the rotation of an adjustable speed rotating screw and sends corresponding hydraulic fluid to a motor which rotates and moves the pipe suppor.

* * * * *